(12) United States Patent
Young

(10) Patent No.: US 8,540,255 B2
(45) Date of Patent: Sep. 24, 2013

(54) COMBINATION OF A TROLLEY FOR CARRYING CLEANING MATERIALS AND BUCKET STRUCTURE

(76) Inventor: Ronald Alexander (Scot) Young, Stourbridge (GB)

(*) Notice: Subject to any disclaimer, the term of this patent is extended or adjusted under 35 U.S.C. 154(b) by 159 days.

(21) Appl. No.: 12/992,539

(22) PCT Filed: May 8, 2009

(86) PCT No.: PCT/GB2009/001135
§ 371 (c)(1), (2), (4) Date: Jan. 5, 2011

(87) PCT Pub. No.: WO2009/138715
PCT Pub. Date: Nov. 19, 2009

(65) Prior Publication Data
US 2011/0121530 A1    May 26, 2011

(30) Foreign Application Priority Data

May 15, 2008  (GB) .................................. 0808858.5
Jul. 10, 2008  (GB) .................................. 0812639.3

(51) Int. Cl.
*B62B 3/00*      (2006.01)
*B62B 11/00*     (2006.01)

(52) U.S. Cl.
USPC ............. 280/47.35; 280/79.11; 280/79.2; 280/47.34

(58) Field of Classification Search
USPC ............. 280/47.35, 47.38, 87.01, 204, 292, 280/411.1, 79.2, 79.3, 79.11, 30, 32.5; D12/97
See application file for complete search history.

(56) References Cited

U.S. PATENT DOCUMENTS 1,491,251 A *  4/1924  Webb .......................... 15/264
2,555,178 A    5/1951  Young
(Continued)

FOREIGN PATENT DOCUMENTS

DE    8704682 U1    7/1987
DE    10010852 A1   9/2001
(Continued)

OTHER PUBLICATIONS

European Search Report completed for corresponding application No. EP 10 19 2448 on Jan. 20, 2011.
(Continued)

*Primary Examiner* — John Walters
*Assistant Examiner* — James Triggs
(74) *Attorney, Agent, or Firm* — Thedford I. Hitaffer; Hitaffer & Hitaffer, PLLC

(57) ABSTRACT

A trolley for carrying cleaning materials includes a main trolley structure having a front end, a rear end, and a pair of sides, front wheels at the front end, back wheels at the rear end, a housing, and a handle structure at the rear end for guiding the main trolley structure over a floor on the wheels. The handle structure is moveable from a stowed condition to an operating condition for guiding the trolley. A bucket structure includes a container for containing cleaning liquid and at least three wheels for stables moveable over the floor independently of the trolley. The housing has a space into which at least a part of the bucket structure may be wheeled from the front end or a side of the pair of sides, such that the bucket structure is substantially within the housing when the bucket structure is received by the space.

17 Claims, 6 Drawing Sheets

(56) References Cited

U.S. PATENT DOCUMENTS

| | | | |
|---|---|---|---|
| 4,350,366 A | 9/1982 | Helms | |
| 5,913,528 A | 6/1999 | Kresse et al. | |
| 6,837,502 B1 * | 1/2005 | Lee | 280/79.5 |
| 7,104,556 B1 * | 9/2006 | Young | 280/47.35 |
| 7,364,172 B1 * | 4/2008 | Archer | 280/79.5 |
| 7,467,801 B1 * | 12/2008 | Garduno | 280/47.26 |
| 7,648,147 B2 * | 1/2010 | Lauer et al. | 280/47.35 |
| 7,988,160 B2 * | 8/2011 | Lindner et al. | 280/47.34 |
| 8,181,974 B1 * | 5/2012 | Galvan et al. | 280/79.5 |
| 2005/0103950 A1 | 5/2005 | Joubert | |
| 2006/0102231 A1 * | 5/2006 | Schiller et al. | 137/355.12 |
| 2007/0267832 A1 * | 11/2007 | Denissov | 280/47.35 |

FOREIGN PATENT DOCUMENTS

| | | |
|---|---|---|
| DE | 202007011085 U1 | 12/2007 |
| EP | 1618862 A2 | 1/2006 |
| WO | WO-2006/053079 A1 | 5/2006 |
| WO | WO-2006/078947 A2 | 7/2006 |

OTHER PUBLICATIONS

Annex to International Search Report Communication relating to the Results of the Partial International Search for PCT/GB2009/001135.

AU 2009247814, Patent Examination Report No. 1, dated Jun. 27, 2012.

PCT/GB2009/001135, International Preliminary Examination Report, dated Nov. 17, 2010 and Written Opinion of the International Searching Authority.

GB0812639.3, Search Report under Section 17, dated Oct. 22, 2008.

GB0812639.3, Examination Report under Section 18(3), dated Jan. 31, 2012.

GB0812639.3, Examination Report under Section 18(3), dated Aug. 10, 2011.

* cited by examiner

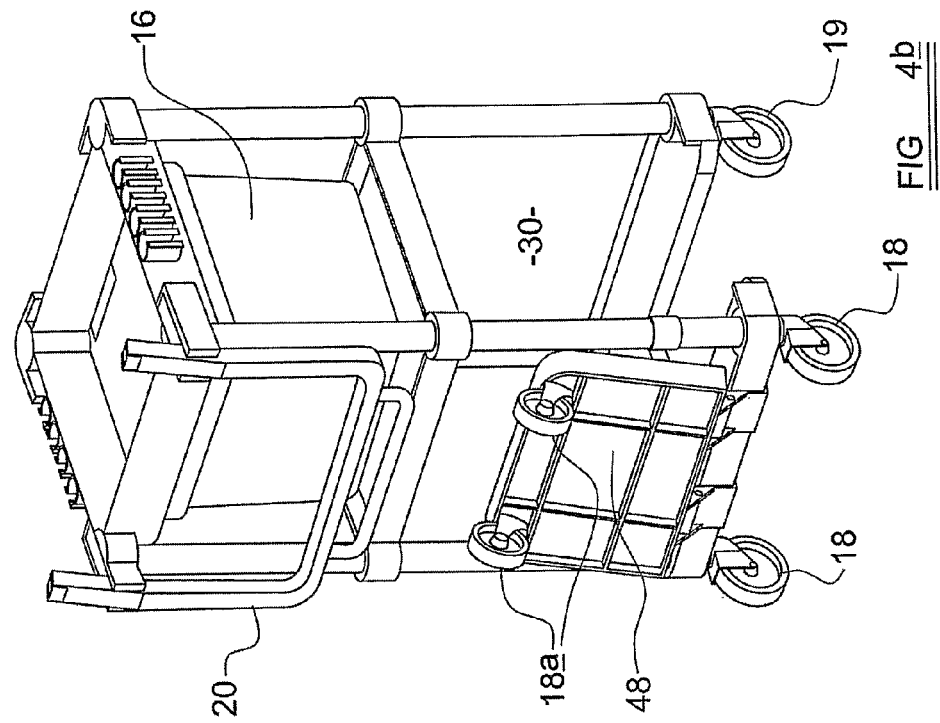
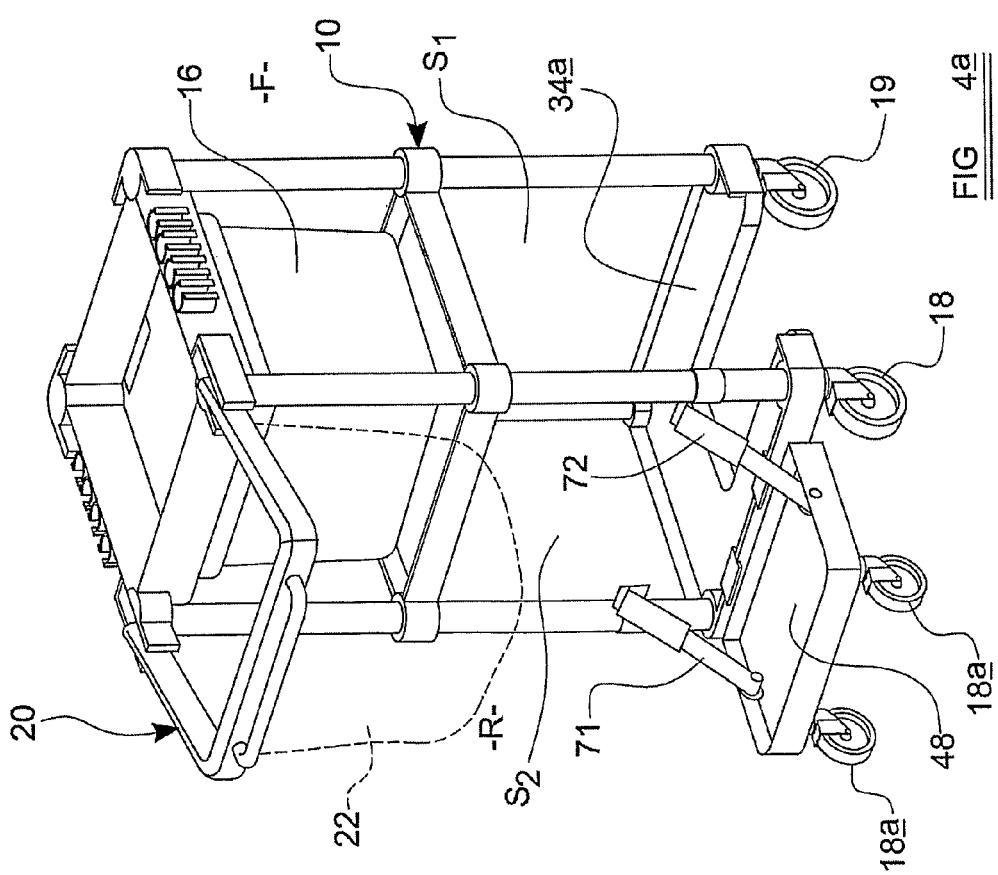

COMBINATION OF A TROLLEY FOR CARRYING CLEANING MATERIALS AND BUCKET STRUCTURE

This application is the U.S. National Stage of PCT Application No. PCT/GB2009/001135 filed on May 8, 2009, which claims priority to Application No. 0808858.5 filed on May 15, 2008, and Application No. 0812639.3 filed on Jul. 10, 2008, both filed in Great Britain, the disclosures of all of which are incorporated herein by reference.

DESCRIPTION OF INVENTION

This invention relates to a combination of a trolley for carrying cleaning materials and a bucket structure.

It is known, for example from my own previous U.S. Pat. No. 7,104,556 to couple a bucket which otherwise is moveable on its own wheels, to a trolley so that the two may be moved together from location to location. The bucket is pushed at a front end of the trolley or pulled at a rear end of the trolley, but such an arrangement can result in bucket instability particularly on uneven floors, as the coupled trolley and bucket are moved. Also the coupled trolley and bucket can result in an overly long vehicle.

According to a first aspect of the invention I provide a combination of a trolley for carrying cleaning materials and a bucket structure, the trolley including a main trolley structure including a front end, a rear end, and a pair of sides, the trolley including front wheels at the front end and back wheels at the rear end, a housing, and a handle structure by means of which the main trolley structure may be guided over a floor on the wheels, the bucket structure including a container for containing cleaning liquid and at least three wheels whereby the bucket structure is stably moveable over the floor independently of the trolley, the housing of the main trolley structure including an accommodation space into which at least a part of the bucket structure may be wheeled from the front end or one of the sides, and there being a retaining device for retaining the bucket structure in the accommodation space and which is readily releasable to permit subsequent separation of the trolley and bucket structure, the housing substantially surrounding the accommodation space on at least two of the front end, the rear end and the pair of sides, and the trolley including at least one storage area for carrying materials used for cleaning.

Throughout this specification, by the term "wheel" or "wheels" we include castors.

By virtue of the present invention the bucket structure, when in the accommodation space, is conveniently moved on its own wheels as the trolley is moved on its wheels, but the bucket may be used independently of the trolley when desired. When at least a part of the bucket structure is accommodated within the accommodation space, the mode of moving the bucket with the trolley is improved compared to arrangements in which the bucket is towed at the back or pushed at the front of the trolley, as with the known proposal identified above, although the trolley may still provide for this functionality as required.

The nature of the bucket structure is not crucial to the invention provided that the bucket structure can be wheeled into the accommodation space from the front end or one of the sides of the trolley and retained therein, and accordingly the bucket structure may have integral wheels and container, or the container may be provided on a dolly which has the bucket structure wheels and from which the container may be separable for example for filling with cleaning liquid such as water, from a tap.

In one arrangement though, the bucket structure includes a wringing mechanism mounted in or on the container, the wringing mechanism including a wringing handle which is moveable to move components of the wringing mechanism for wringing a mop for example. Typically the wringing mechanism is sprung so that the handle is urged towards a raised condition. In one embodiment, when the bucket structure is at least partially received in the accommodation space, the wringing handle may be urged to co-operate with a retainer part of the main trolley structure to provide the retaining device to retain the bucket structure in the accommodation space.

In another example, the main trolley structure may include a retaining element which is moveable from a stowed position when the bucket structure can be wheeled into the accommodation space, to a retaining position in which the retaining element engages with the bucket structure to provide the retaining device. The retaining element may for example be a bar pivotable relative to the main trolley structure between its stowed and retaining positions.

In one arrangement, the handle structure is moveable up or down relative to the main trolley structure from a stowed condition to an operating condition in which the handle structure is usable for pushing and/or pulling and guiding the trolley. Desirably, when the handle structure is in its stowed condition the main trolley structure is contained substantially within a spatial footprint which is not significantly larger than the housing. In this way a particularly compact trolley may be provided when the handle structure is in its stowed conditions and irrespective of whether or not the bucket structure is accommodated in the housing, so that the trolley when stored, or at least parked, occupies minimal floor space.

However, if desired, when the handle structure is in its operative condition, the handle structure might be used as a support for a depending container such as a rubbish box or bag, which may need to be removed when it is desired to wheel the trolley, into the accommodation space from an end where the handle is provided.

The handle structure may be provided at a front end or a rear end of the main trolley structure. The bucket structure may be receivable in the accommodation space by wheeling in from the front end of the main trolley structure or from one side, and the bucket structure may abut a retainer member of the main trolley structure so that the bucket structure may be retained in the accommodation space between the retainer member and the retaining device.

If desired, the retainer member may be separable from the remainder of the main trolley structure and engageable with the remainder of the main trolley structure in a first location in which the retainer member retains the bucket structure when wheeled into the accommodation space from the front end of the main trolley structure or one side, and a second location in which the retainer member retains the bucket structure when wheeled into the accommodation space from the rear end or other side of the main trolley structure.

Of course a big main trolley structure may accommodate more than one bucket structure in the housing, each in its own accommodation space, as desired. In this case, one bucket structure may be wheeled into its accommodation space from the front end of the main trolley structure another bucket structure from one side, or each of a pair of bucket structures may be wheeled into the accommodation space from respective trolley sides.

The main trolley structure may provide at one or both of the rear and front ends, a support, such as a platform and/or a frame part, for a storage container such as a rubbish bin for example only, or another item, to be carried on the support.

In one example, the support, or one of the supports, may be foldable from a lowered 'in use' position, to an upper stowed position. The or at least one of the supports, may have its own wheels.

According to a second aspect of the invention I provide a cleaning trolley for use in the combination of the first aspect of the invention.

According to a third aspect of the invention we provide a trolley for carrying cleaning materials, the trolley including a main trolley structure including a front end, a rear end, and a pair of sides, the trolley including front wheels at the front end and back wheels at the rear end whereby the trolley is moveable over a floor on the wheels, and the trolley including a carrying structure extending outwardly of one of the front and rear ends and the sides of the main trolley structure, for mounting a carrying device which depends from the carrying structure, and the trolley including a support which is foldable at the one of the front and rear ends and the sides, between a lowered "in use" position in which at least one support wheel of the support engages the floor, and a raised position when the wheel of the support is raised clear of the floor, wherein the support is lockable in its lowered "in use" position.

It will be appreciated that for a trolley with a relatively small spatial footprint, and a carrying structure which extends outwardly of the main trolley structure, as the suspended carrying device is loaded, this could lead to trolley instability. However by providing the support at the same end or side of the main trolley structure as the carrying device, which has its own wheel or wheels, the support will support the trolley against such stability.

The support being lockable in its lowered "in use" position by a suitable mechanism which can readily be released when it is desired to fold up the support, for example to reduce the spatial footprint of the trolley to facilitate stowage, provides maximum support to the trolley.

Desirably the carrying structure is a handle by means of which the trolley structure may be guided over a floor. Desirably the handle is itself moveable relative to the main trolley structure from a stowed condition, when not mounting a carrying device, to an operating condition in which the carrying device may be mounted to depend from the carrying device.

The cleaning trolley of the third aspect of the invention may have any of the features of the trolley of the combination of the first aspect of the invention.

Embodiments of the invention will now be described with reference to the accompanying drawings in which:

FIG. 4a is a perspective illustrative view of a trolley in accordance with the third aspect of the invention showing a support thereof in a lowered "in use" position;

FIG. 4b is an alternative view of the FIG. 4a trolley showing the support thereof in a raised stowed position;

FIG. 5b is an illustrative view of the underside of the trolley of FIG. 5a.

Figure 1:
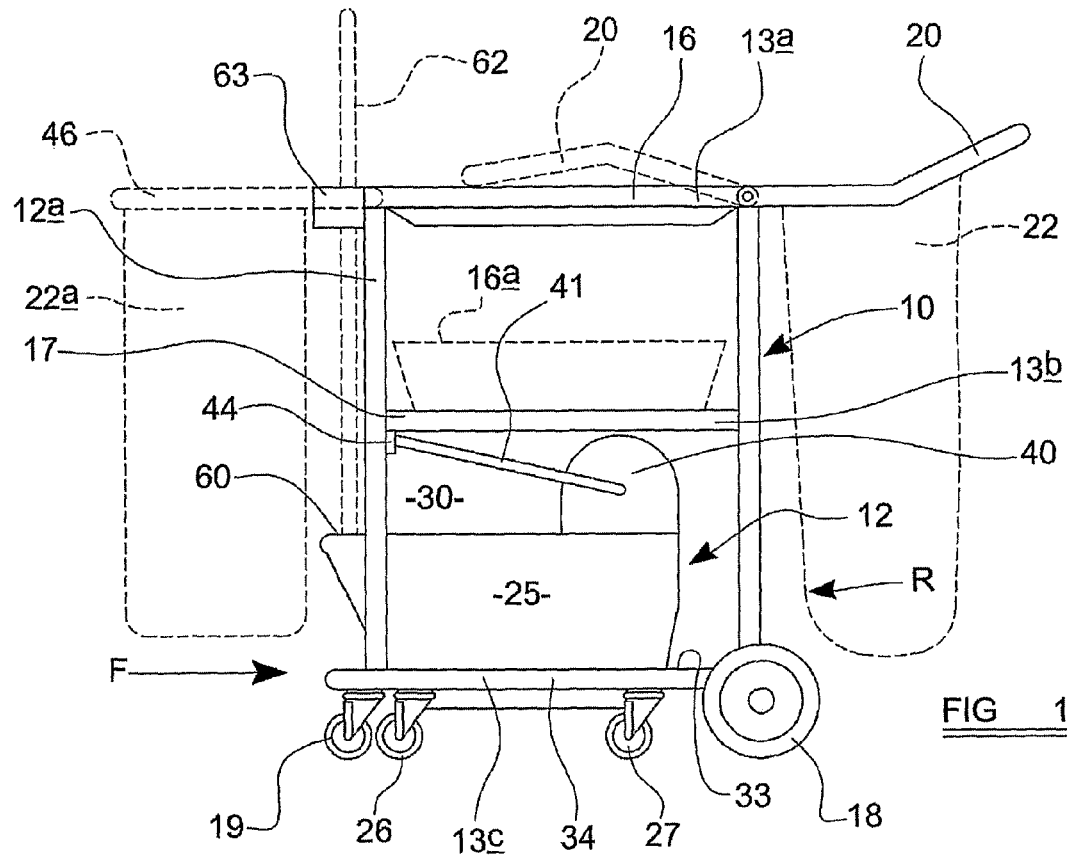
FIG. 1 is a side illustrative view of a combination of a main trolley structure and bucket structure in accordance with the first aspect of the invention.
Figure 1B:
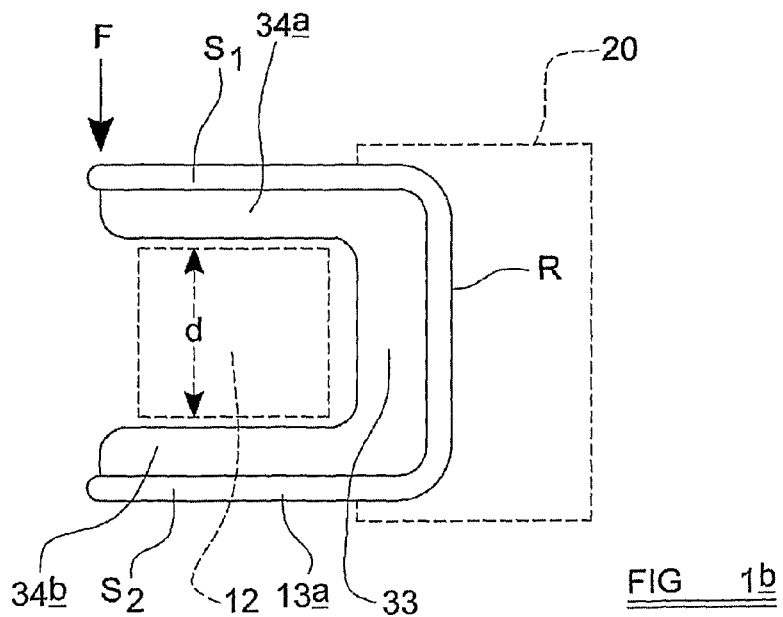
FIG. 1b is a plain view of the combination of FIG. 1.

Referring first to FIGS. 1 and 1b, there is shown a combination of a main trolley structure 10 and a bucket structure 12.

The main trolley structure 10 includes a box-like framework of upright frame members 12a and 12b (four in the example), and horizontal frame members 13a, 13b, 13c, which provide a housing 15 and at least one area for the storage of cleaning items and materials, such as a tray 16 at the upper end, and a shelf 17 intermediate the tray 16 and the frame member 13c, which if desired could mount another tray, indicated in dotted lines at 16a. In this example the main trolley structure 10 is a generally open framework, but may include side and/or end walls as required. The framework shown is purely exemplary and many modifications are possible within the scope of the invention.

The main trolley structure 10 includes in this example four wheels, namely a pair of larger rear wheels 18, one at each rear end corner of the main trolley structure 10 and which in this example are fixed wheels which rotate about a common axis of rotation, and a pair of front wheels or castors 19, one at each of the front end corners of the main trolley structure 10.

Mounted on the main trolley structure 10 is a handle structure 20. In this example, the handle structure 20 is pivoted, but may otherwise be moveable, relative to the main trolley structure 10, between an upwardly stowed position as shown in dotted lines, in which the handle structure 20 is contained or substantially contained within the spatial footprint of the housing 15 trolley structure 10, and the lowered operative position shown in full lines in which the handle structure 20 can be used for pushing and guiding the main trolley structure 10 forwards on its wheels/castors 18, 19, or for pulling rearwards.

As shown in dotted lines in FIG. 1, if desired, when the handle structure 20 is in its operative position, a container such as a rubbish box or bag 22 may depend from the handle structure 20. The handle structure 20 may be provided with hooks or similar formations to facilitate this.

The bucket structure 12 includes a container 25 and a wheeled structure. In this example, the wheeled structure includes a pair of front 26 and a pair of rear 27, castors or wheels, which are integral with or secured to the container 25, but in another example, the bucket structure 12 may include a separable container 25 and wheeled dolly. Instead of four wheels or castors 26, 27 the bucket structure 12 may have more than four or only three as required, to enable the bucket structure 12 to be moved stably and independently of the main trolley structure 10 on a floor, as desired.

In accordance with the present invention, at least a part of the bucket structure 12 may be received within an accommodation space 30 provided by the housing 15 of the main trolley structure 10, by wheeling the bucket structure 12 into the accommodation space 30, in this example rear wheels 27 first, from a front end F of the main trolley structure 10, opposite the rear end R from where the handle structure 20, when in its operative position, extends. To this end the lowermost horizontal frame members 13c are unconnected at the front end F of the main trolley structure 10, and provide between them, a receiving part 32 which includes a retainer member 33 which extends between the frame members 13c at or towards the rear end R of the main trolley structure 10, and side members 34a, 34b which are spaced just wider apart than the corresponding lateral dimension d of the bucket structure 12 which is received between the side members 34a, 34b. Thus when in the accommodation space 30, the bucket structure 12 is surrounded by the housing at each of two sides 51, 52 and the rear end R.

The bucket structure 12 further includes its own handle which is not shown, and a wringing mechanism 40 which is received in and/or on the container 25. The wringing mechanism 40 includes a pivotal wringer handle 41 which in normal use, when the bucket structure 12 is not accommodated in the accommodation space 30, is operable to move components of the wringing mechanism 40 to wring a mop for example. The mechanism 40, is sprung biased so that the wringer handle 41 is naturally biased to a pivoted up position as indicated by the dotted line drawing of the bucket structure 12 outside of the accommodation space 30 in FIG. 1.

In this example, the main trolley structure 10, or at least a cross member 44 of the frame located towards the front end F of the trolley structure 10, provides a part of a retaining device for retaining the bucket structure 12 in the accommodation space 30. The wringer handle 41 needs to be pivoted downwards against the spring force as the bucket structure 12 is wheeled into the accommodation space 30, and will spring back upwards so as to engage the cross member 44 thus to trap the bucket structure 12 in the accommodation space 30 until released by a user manually disengaging the wringer handle 41 and the cross member 44. Thus in this example, the wringer handle 41 provides a retaining device, and the bucket structure 12 is retained between the retaining device 41 and the retaining member 33.

Many other alternative arrangements for retaining the bucket structure 12 in the accommodation space 30 are possible, which may involve use of the wringer handle 41 or not. For example the main trolley structure 10 may be provided with a pivotal retaining element which can be lowered from a stowed position to engage the container 25 of the bucket structure 12 and retain the bucket structure 12 in the accommodation space 30.

If desired, as indicated in dotted lines in FIG. 1, at the front end F of the main trolley structure 10, a support 46 for supporting a depending rubbish box or bag 22a, as an addition or alternative to the bag 22 shown supported by the handle structure 20, may be provided, as required. If desired, the support 46 may be foldable relative to the main trolley structure 10 like the handle structure 20, to minimise the spatial footprint of the trolley when the trolley is stowed e.g. in a cupboard, or is parked in a stowage space.

As mentioned above, in this embodiment, to retain the bucket structure 12 in the accommodation space 30 as the trolley structure 10 and bucket structure 12 are together wheeled over a floor, a pivotal retaining element is lowered into an operative position to engage the bucket structure 12, but the wringer handle 41 may be used in conjunction with a cross member 44 alternatively as required.

Figure 2:
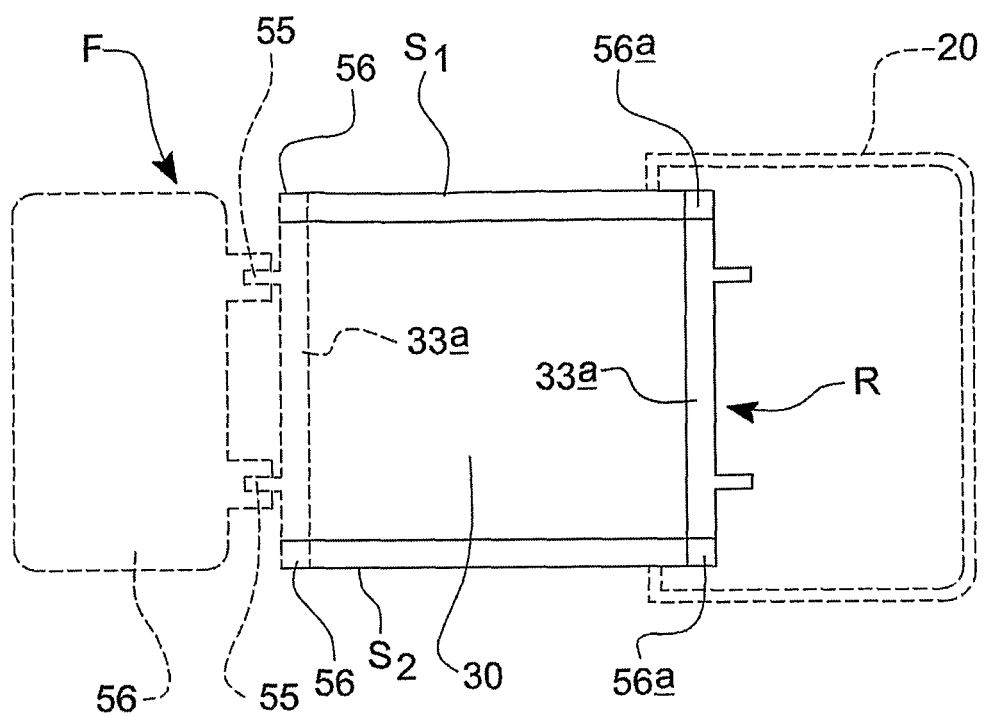
FIG. 2 is a view similar to FIG. 1b, but of another embodiment.

FIG. 2 illustrates yet another embodiment in which parts corresponding to those already described are indicated by the same references. In FIG. 2, the main trolley structure 10 can be adapted to receive the bucket structure 12 from the front end F. In FIG. 2, in full lines, the retainer member 33a is shown located at the rear end R of the main trolley structure 10 so that the bucket structure 12 can be wheeled into the accommodation space 30 from the front end F, in similar manner to that described with reference to FIG. 1. However the retainer member 33a in this example, is connected to the remainder of the trolley structure 10 by one or more releasable fixings 56a, and can be removed, replaced and repositioned relative to the main trolley structure 10. For example the retainer member can alternatively be located, by means of the releasable fixings 56a at a front end F of the main trolley structure 10, in the position indicated in dotted lines in FIG. 2. Moreover, in this embodiment, the retainer member 33a is provided with connectors 55 which may be used to connect another wheeled structure, such as another bucket structure 56, or a wheeled platform, to the main trolley structure 10 and moved with the main trolley structure 10 (and bucket structure 12 when present in the accommodation space 30) as one.

In each of the embodiments illustrated, it can be seen that the bucket structure 12 containers 25 have a forwardly extending upper rim 60. In FIG. 1 especially it can be seen that when the bucket structure 12 is received in the accommodation space 30, the projecting rim 60 extends to a position in front of the trolley framework. Conveniently therefore, cleaning items with long handles, such as mops indicated at 62 in FIG. 2, can be received in the container 25 with the handle or handles extending upwardly where they may be held or at least supported by a retainer 63 provided in or by or on the main trolley structure 10. Thus particularly wet mops, may be transported in the container 25 with their handles well supported, as the main trolley structure 10 and bucket structure 12 (in the accommodation space 30) are wheeled together over the floor.

Figure 3:
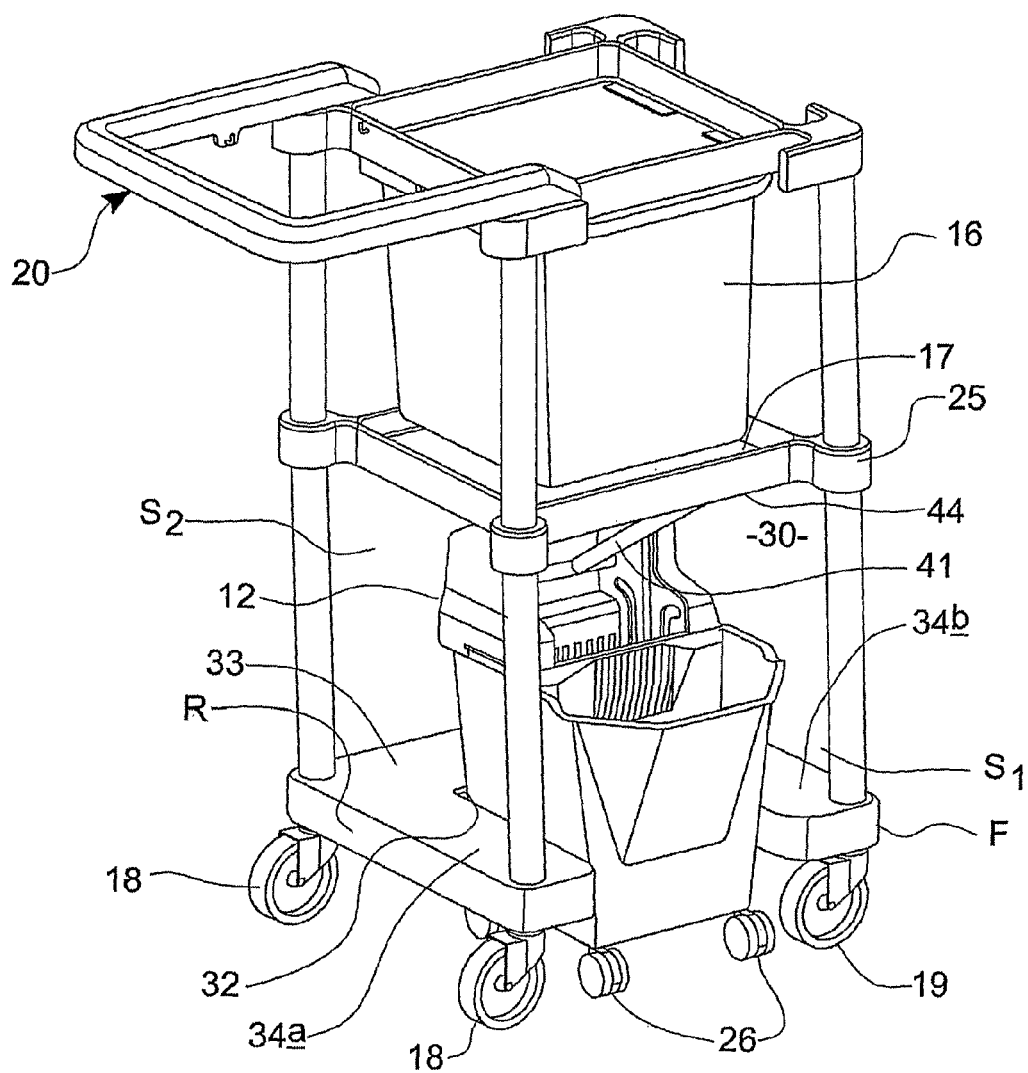
FIG. 3 is a perspective illustrative view of yet another embodiment.

Referring to FIG. 3, a trolley structure 10 is illustrated in which the bucket structure 12 may be wheeled into the accommodation space from one side S1 of the housing 15, the framework of the trolley structure having cross members at the front end F and at the rear end R and at the other side S2 of the housing 15.

A receiving part 32 of the trolley structure 10 has a retainer member 33 along the side S2 of the housing 15 opposite where the housing 15 permits the bucket structure 25 to be wheeled into the accommodation space 30, and side members 34a, 34b along the front F and rear R ends of the housing 15, to provide the receiving part 32.

In this example a retaining device is provided by the wringer handle 41 and a cross member 44 which extends along the one side S1 of the trolley structure 10.

Otherwise in this example, the handle structure 20 is foldable up to a stowed condition, as in the previous examples, and a tray 16 is provided at the upper end of the trolley structure 10 which is deeper than the tray 16 in for example FIG. 1. Otherwise the trolley structure 10 in FIG. 6 is similar functionally to the trolley structures 10 in the previous figures.

The trolley structure 10 in FIG. 6 may be longer than in the illustrated version, such that a pair of bucket structures 12 (or more) could be accommodated in the accommodation space 30, or respective accommodation spaces, in which case each bucket structure 12 may be wheeled into the or its respective accommodation space 30 from the one side S1, or the opposite side S2 of the housing 15 if the retainer member 33 runs alongside side S1. In another example, one bucket structure 12 may be wheeled into the or its respective accommodation space 30 from the one side S1, and the other from the other side S2 of the trolley structure 10.

In each example, in accordance with the present invention, the bucket structure 12, although retained in the accommodation space 30, moves on its own wheels 26, 27 or castors, as the trolley structure 10 is pushed or pulled over the floor.

Referring to FIGS. 4a and 4b, a trolley in accordance with the third aspect of the invention is shown, but which trolley may be used in the combination of the first and second aspect of the invention, with a wheeled bucket structure in this example. This as with the preceding described embodiments, the trolley affords an accommodation space 30 into which a bucket structure may wheeled. However a trolley in accordance with the third aspect of the invention may not be adapted to be used in combination with a wheeled bucket structure. In this case the trolley need not have the accommodation space 30.

In FIGS. 4a and 4b, similar parts to the trolleys of the previous figures are indicated by the same references.

The trolley has a main trolley structure 10 similar to that shown in FIG. 3, including a handle structure 20 which extends outwardly of a rear end R of the trolley in this example. The handle structure 20 is foldable between a raised "in use" condition shown in FIG. 4a, at which a carrying device, such as a rubbish box or bag 22 may be mounted by the handle structure 20 so that the carrying device 22 depends from the handle structure or carrying structure 20, and a lowered stowed condition as seen in FIG. 4b. The position of the carrying device 22 is indicated in FIGS. 4a and 4b in dotted lines.

The handle structure 20, in order to support the weight of a loaded rubbish box or bag 22, is lockable in its raised condition by any desired locking mechanism.

The main trolley structure 10 carries at a front end F front wheels 19, and at the rear end R, rear wheels 18. The main trolley structure 10 has sides S1, S2 between the front end F and the rear end R. The wheels 18, 19 enable the trolley to be moved over a floor, guided by the handle structure 20.

In accordance with the third aspect of the invention, the trolley includes at the rear end R a support 48 which is foldable at the rear end R, between a lowered "in use" position shown in FIG. 4a in which support wheels 18a of the support 48 engage the floor, and a raised position shown in FIG. 4b when the wheels 18a of the support 48 are raised clear of the floor. The support 48 may be a platform or just one or more frame parts as required. In this example, the support 48 carries a pair of wheels or castors 18a at the very rear end R of the trolley structure 10. Thus the trolley structure 10 has three pairs of wheels/castors 18, 18a, 33 when the support 48 is folded down.

It will be appreciated the main trolley structure 10 of the trolley of FIGS. 4a and 4b has a relatively small spatial footprint. A carrying structure i.e. in this example the handle structure 20, which extends outwardly of the main trolley structure 10, with a suspended and loaded carrying device such as the rubbish box or bag 22, could lead to trolley instability. However by providing the support 48 at the rear end R of the main trolley structure 10 where the carrying device 22 is provided, the support 48 having its own wheel or wheels 18a, the support 48 will support the trolley against such stability on the floor.

For maximum support, preferably the support 48 is lockable in its lowered "in use" position by a suitable mechanism which can readily be released when it is desired to fold up the support 48 to the FIG. 4b position, for example to reduce the spatial footprint of the trolley to facilitate stowage.

In this example the support 48 is pivoted to the main trolley structure 10 by a pair of articulated struts 71, 72 which can lock the support 48 in its lowered "in use" position but can permit the support 48 to folded up close to the rear side R. Any desired pivoting/locking mechanism may be provided which is suitable.

In a modified embodiment, the support may only have a single wheel 18a or more than a pair of support wheels 18a. The support 48 may be hinged, pivoted, articulate or otherwise is foldable between the lowered and raised positions.

Although desirably the carrying structure 20 is a handle structure 20 by means of which the trolley structure may be guided over a floor, in another example the carrying structure 20 may be provided separately to a handle, for example at a front end F of the main trolley structure 20, or even at one or other of the sides S1, S2. In each case the support 48, in order to counteract turning forces which could lead to instability of the trolley as the carrying device 22 is loaded for example, is provided at the same end R, F or side S1, S2 of the main trolley structure 10.

Although it is strongly preferred that the handle/carrying structure 20 is foldable as described, in another example the handle/carrying structure 20 could be rigid to the main trolley structure 10, although in that case the spatial footprint of the trolley could not be reduced for stowage to the extent shown in FIG. 7b.

In this example, the support 48 provides a platform on which cleaning items may be carried, but in another example, the support 48 may be a simple framework carrying the support wheel or wheels 19a.

Figure 5A:
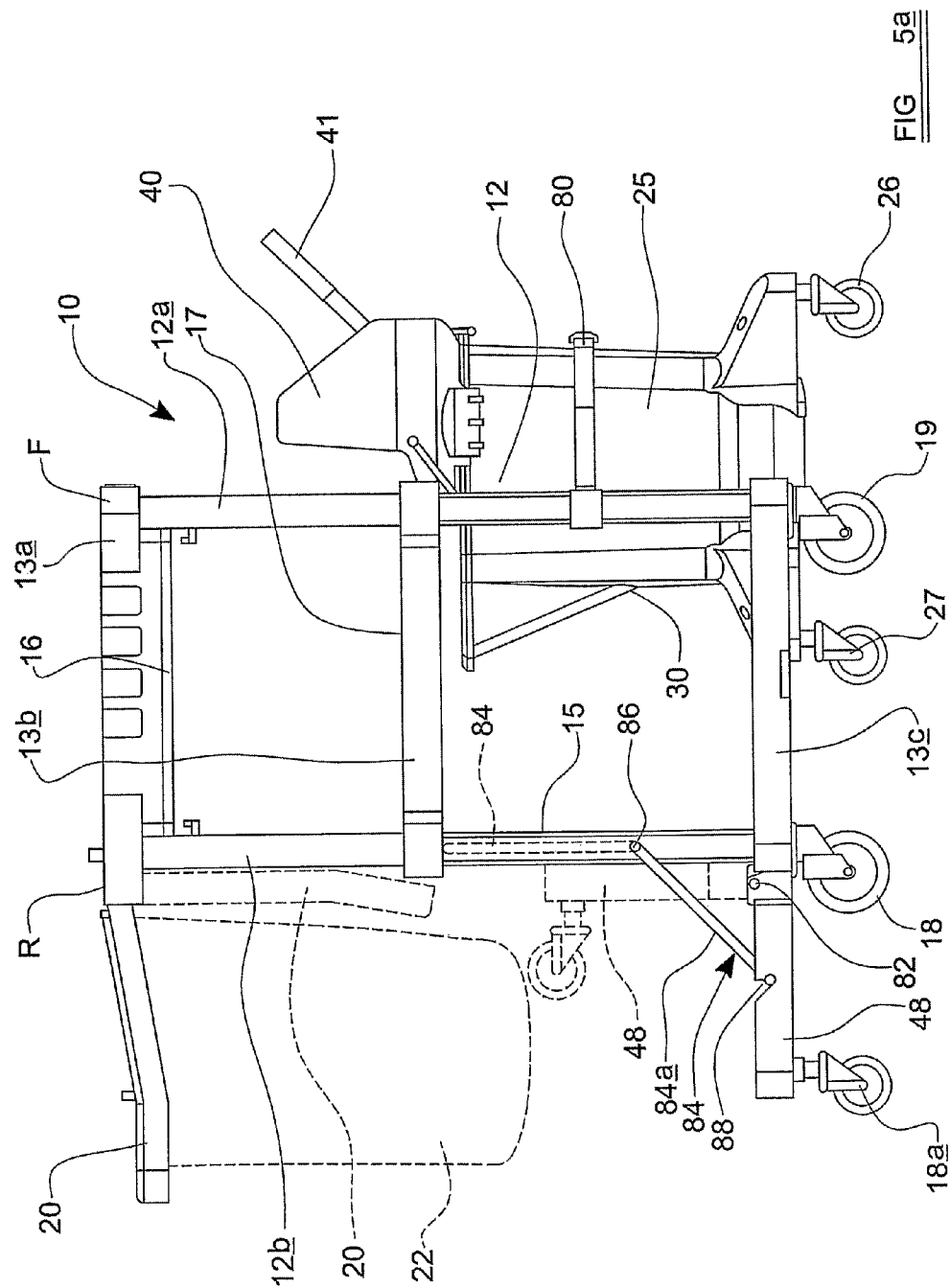
FIG. 5a is a side illustrative view of another embodiment.
Figure 5B:
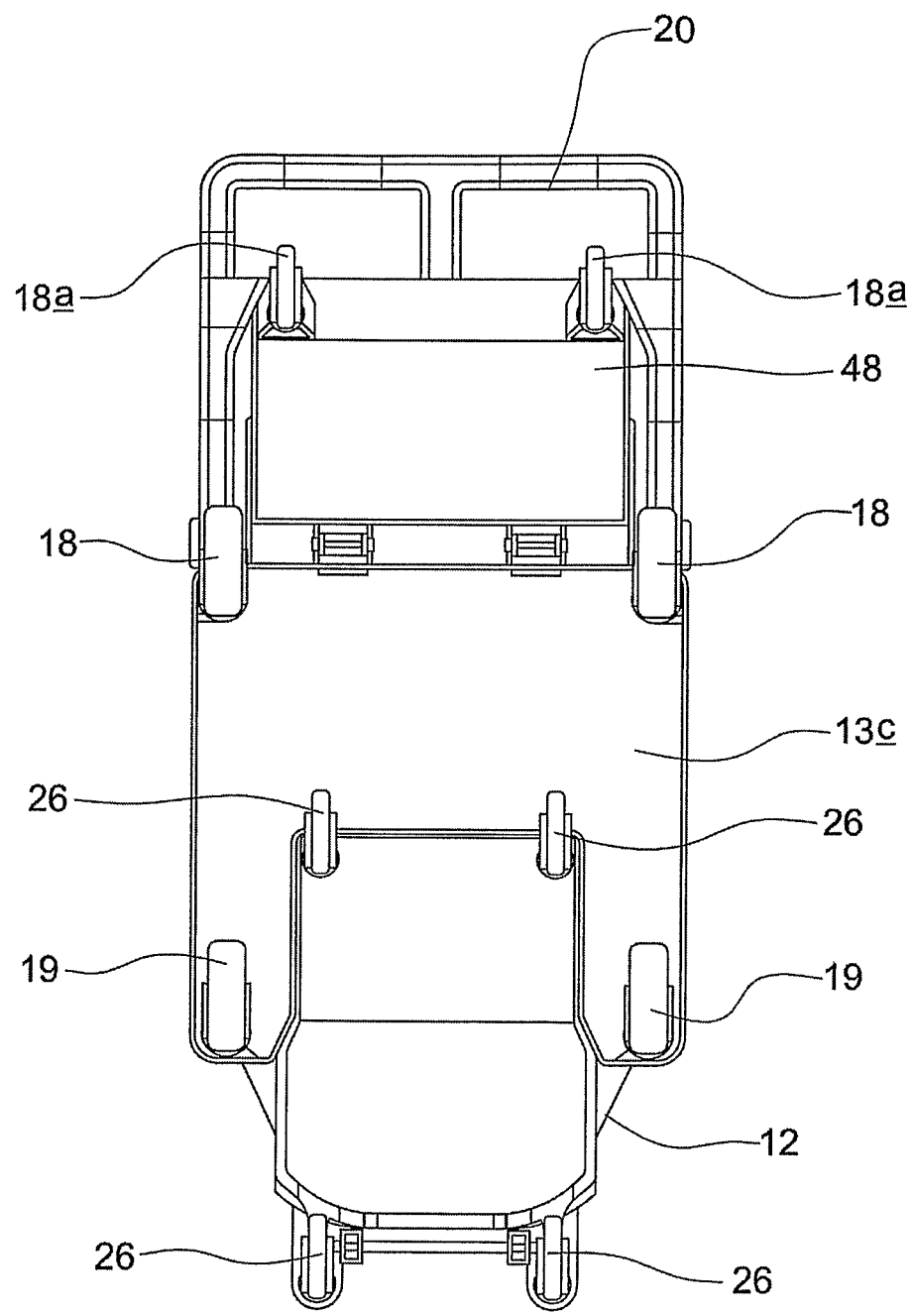

FIGS. 5a and 5b show a trolley structure 10 which is similar to that shown in FIGS. 4a and 4b. The main trolley structure 10 has a front end F, front wheels 19, a rear end R and rear wheels 18. The trolley includes, at the rear end R, a support 48 which is foldable between a lowered "in use" position, in which support wheels 18a of the support 48 engage the floor, and a raised position (shown in dotted lines) when the wheels 18a of the support are raised clear of the floor.

The main trolley structure 10 has a small spatial footprint. A carrying structure, in this example the handle structure 20, extends outwardly of the main trolley structure 10, and with a suspended load carrying device such as a rubbish bag or box 22, could lead to trolley instability. However, the support 48 at the rear end R of the main trolley structure 10 is able to counteract such instability and to support the trolley on the floor.

The support 48 is lockable in its lowered "in use" position by a suitable mechanism which can be readily released when it is desired to fold up the support 48 to reduce the spatial footprint of the trolley to facilitate storage. In this example, the support 48 is pivotable about a hinge positioned at the rear end R of the main support trolley 10. The support 48 includes a locking member 84 which is pivotable relative to the frame member 12b about a fulcrum 86. The locking member 84 is, in this example, a substantially u-shaped bar including a pair of side members 84a and a cross member extending between the side members 84a. The support 48 includes a recess 88 with which the locking member 84, in particular the cross member of the locking member 84, is engageable to retain the support 48 in its in-use position. It will be understood that other forms of locking member 84 may be provided.

In this example, the bucket structure 25 can be accommodated in an accommodation space 30 which is provided at the front end F of the main trolley structure 10. The trolley includes a retaining device 80 for retaining the bucket structure 25, or at least a part thereof, in the accommodation space 30. The retaining device 80 may be a removeable strap, a pivotable bar or other similar device. Preferably the retaining device 80 does not permanently increase the spatial footprint of the main trolley structure 10.

Various modifications in addition to those already indicated may be made without departing from the scope of the present invention. For example, the main trolley structure 10 may have more than one shelf 17 or no shelf at all, and need not have a tray 16 supported by the uppermost horizontal frame members 13a, but could include an insert with compartments which may be adapted to carry specific cleaning items such as bottles of cleaning fluid for example, or any other facility and area for carrying cleaning items by which we mean utensils and materials including chemicals.

The main trolley structure 10 need not include a framework as described, but may otherwise be fabricated and/or constructed.

Instead of "fixed" rear wheels 18 as described, castors may be provided at or adjacent each of the corners of the trolley structure 10. The wheels 18/19 may all be of the same size, or as in the example, the rear wheels 18 may be larger than the front wheels 19 or castors.

Although it is preferred for the handle structure 20 to be stowable as described by pivoting relative the main trolley structure 10, the handle structure 20 may be fixed, but the trolley would not then be so compact and easily stowable/parked.

Although the trolley structure 10 described is intended to be manually propelled on the wheels 18/19 or castors, the invention does not preclude the provision of a motor or engine to propel the trolley structure 10, in which case the handle structure 20 may be used solely for guiding rather than propulsion and guiding.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A combination of a trolley for carrying cleaning materials and a bucket structure, the trolley including a main trolley structure including a front end, a rear end, and a pair of sides, the trolley including front wheels at the front end and back wheels at the rear end, a housing, and a handle structure provided at the rear end by means of which the main trolley structure may be guided over a floor on the wheels, the handle structure being moveable relative to the main trolley structure from a stowed condition to an operating condition in which the handle structure is usable for guiding the trolley, the bucket structure including a container for containing cleaning liquid and at least three wheels whereby the bucket structure is stably moveable over the floor independently of the trolley, the housing of the main trolley structure including an accommodation space into which at least a part of the bucket structure may be wheeled from the front end or from a side of the pair of sides, such that the bucket structure is substantially within the housing when the bucket structure is received by the accommodation space, and there being a retaining device for retaining at least a part of the bucket structure in the accommodation space and which is readily releasable to permit subsequent separation of the trolley and bucket structure, the housing substantially surrounding the accommodation space on at least two of the front end, the rear end and the pair of sides, and the trolley including at least one storage area for carrying materials used for cleaning.

2. A combination according to claim 1 wherein the bucket structure has integral wheels and container.

3. A combination according to claim 1 wherein the container is provided on a dolly which has the bucket structure wheels and from which the container is separable.

4. A combination according to claim 1, herein the bucket structure includes a wringing mechanism mounted in or on the container, the wringing mechanism including a wringing handle which is moveable to move components of the wringing mechanism, and the wringing mechanism is sprung so that the wringing handle is urged towards a raised condition and when the bucket structure is received in the accommodation space, the wringing handle is urged to co-operate with a retainer part of the main trolley structure to provide the retaining device to retain the bucket structure in the accommodation space.

5. A combination according to claim 1, wherein the main trolley structure includes a retaining element which is moveable from a stowed position where the bucket structure can be wheeled into the accommodation space, to a retaining position in which the retaining element engages with the bucket structure to provide the retaining device.

6. A combination according to claim 5 wherein the retaining element is a bar pivotable relative to the main trolley structure between its stowed and retaining positions.

7. A combination according to claim 1 wherein when the handle structure is in its stowed condition the main trolley structure is contained substantially within a spatial footprint which is not significantly larger than the housing.

8. A combination according to claim 1, wherein the handle structure is useable as a support for a depending container.

9. A combination according to claim 1 wherein the bucket structure abuts a retainer member of the main trolley structure so that the bucket structure may be retained in the accommodation space between the retainer member and the retaining device.

10. A combination according to claim 1 wherein the main trolley structure provides the accommodation space for the bucket structure at or towards one of the front end of the main trolley structure, and at rear end, the main trolley structure provides a support, for an item to be carried on the support.

11. A combination according to claim 10 wherein the support, or one of the supports is foldable from a lowered 'in use' position to an upper stowed position.

12. A combination according to claim 11 wherein the support is lockable in the lowered, in use, position.

13. A trolley for carrying cleaning materials, the trolley including a main trolley structure including a front end, a rear end, and a pair of sides, the trolley including front wheels at the front end and back wheels at the rear end, a housing, and a handle structure provided at the rear end by means of which the main trolley structure may be guided over a floor on the wheels, the handle structure being moveable relative to the main trolley structure from a stowed condition to an operating condition in which the handle structure is usable for guiding the trolley, the housing of the main trolley structure including an accommodation space into which at least a part of a wheeled bucket structure may be wheeled from the front end or from a side of the pair of sides, such that the bucket structure is substantially within the housing when the bucket structure is received by the accommodation space, and there being a retaining device for retaining at least a part of the bucket structure in the accommodation space and which is readily releasable to permit subsequent separation of the trolley and bucket structure, the housing substantially surrounding the accommodation space on at least two of the front end, the rear end and the pair of sides, and the trolley including at least one storage area for carrying materials used the cleaning.

14. A trolley for carrying cleaning materials, the trolley including a main trolley structure including a front end, a rear end, and a pair of sides, the trolley including front wheels at the front end and back wheels at the rear end whereby the trolley is moveable over a floor on the wheels, and the trolley including a carrying structure extending outwardly of one of the front and rear ends and the sides of the main trolley structure, for mounting a carrying device which depends from the carrying structure, and the trolley including a support which is foldable at the one of the rear ends and the sides, between a lowered "in use" position in which at least one support wheel of the support engages the floor, and a raised position when the wheel of the support is raised clear of the floor, wherein the support is lockable in its lowered "in use" position.

15. A trolley according to claim 14 wherein the carrying structure is a handle by means of which the trolley structure may be guided over a floor.

16. A trolley according to claim 15 wherein the handle is moveable relative to the main trolley structure from a stowed condition, when not mounting a carrying device, to an operating condition in which the carrying device may be mounted to depend from the carrying structure.

17. A trolley according to claim 14, wherein the main trolley structure includes an accommodation space into which at least part of a bucket structure may be wheeled, the accommodation space being located at the front end of the main trolley structure and the support being located at the rear end of the main trolley structure.

* * * * *